E. SERDUK.
AUTOMATIC GATE.
APPLICATION FILED FEB. 27, 1919.

1,312,877.

Patented Aug. 12, 1919.
7 SHEETS—SHEET 1.

INVENTOR
Ewtihiy Serduk.
BY
Frederick Myers
his ATTORNEY

E. SERDUK.
AUTOMATIC GATE.
APPLICATION FILED FEB. 27, 1919.

1,312,877.

Patented Aug. 12, 1919.
7 SHEETS—SHEET 2.

INVENTOR
Ewtihiy Serduk.
BY
his ATTORNEY

E. SERDUK.
AUTOMATIC GATE.
APPLICATION FILED FEB. 27, 1919.
1,312,877.
Patented Aug. 12, 1919.
7 SHEETS—SHEET 3.
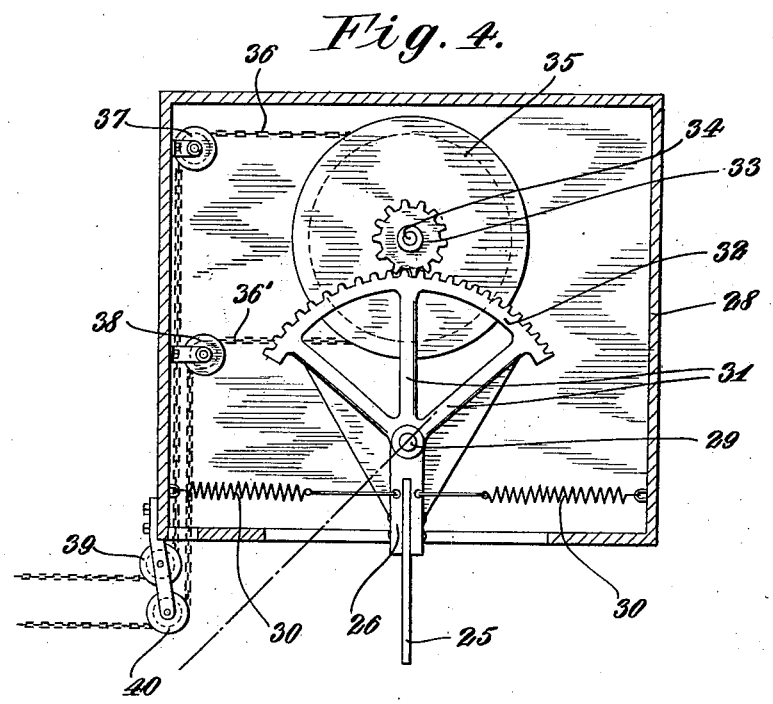
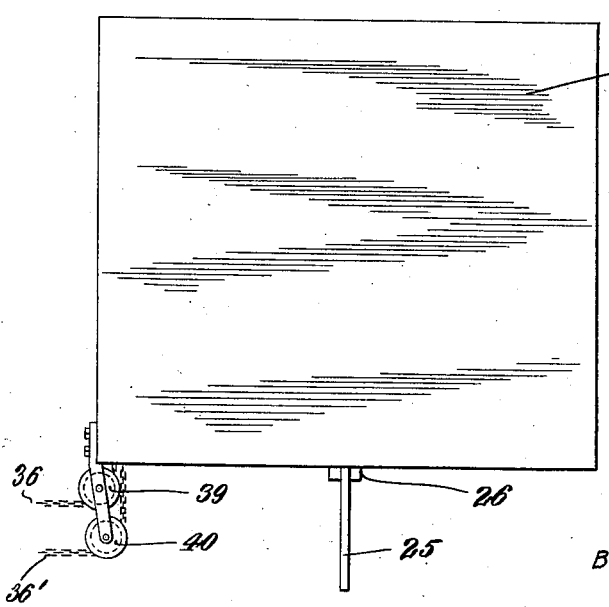
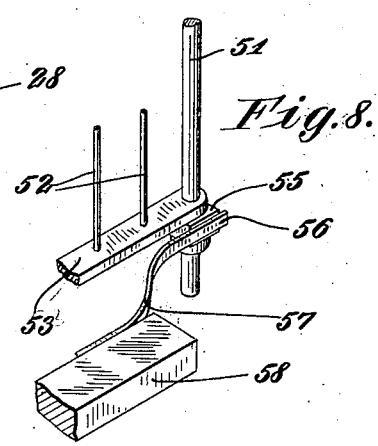
INVENTOR
Evtihiy Serduk.
BY
HIS ATTORNEY

E. SERDUK.
AUTOMATIC GATE.
APPLICATION FILED FEB. 27, 1919.

1,312,877.

Patented Aug. 12, 1919.
7 SHEETS—SHEET 4.

INVENTOR
Ewtihiy Serduk.
BY Frederick Myers
his ATTORNEY

E. SERDUK.
AUTOMATIC GATE.
APPLICATION FILED FEB. 27, 1919.

1,312,877.

Patented Aug. 12, 1919.
7 SHEETS—SHEET 5.

INVENTOR
Ewtihiy Serduk.

BY
Frederick Myers
his ATTORNEY

E. SERDUK.
AUTOMATIC GATE.
APPLICATION FILED FEB. 27, 1919.

1,312,877.

Patented Aug. 12, 1919.
7 SHEETS—SHEET 6.

INVENTOR
Ewtihiy Serduk.

BY Frederick Myers
his ATTORNEY

E. SERDUK.
AUTOMATIC GATE.
APPLICATION FILED FEB. 27, 1919.

1,312,877.

Patented Aug. 12, 1919.
7 SHEETS—SHEET 7.

Inventor
Ewtihiy Serduk.
By Frederick Myers
his Attorney

UNITED STATES PATENT OFFICE.

EWTIHIY SERDUK, OF AVONLEA, SASKATCHEWAN, CANADA.

AUTOMATIC GATE.

1,312,877.  Specification of Letters Patent.  Patented Aug. 12, 1919.

Application filed February 27, 1919. Serial No. 279,502.

*To all whom it may concern:*

Be it known that I, EWTIHIY SERDUK, a citizen of Russia, residing at Avonlea, Prov. of Saskatchewan, and Dom. of Canada, have invented certain new and useful Improvements in Automatic Gates, of which the following is a specification.

This invention relates to improvements in automatically operated railway gates, adapted to be applied at highway crossings to prevent injury to travelers.

The principal object of the invention is to provide a gate which will automatically close the highway to pedestrians and vehicles upon the approach of a locomotive on the railway, thereby avoiding danger and accident.

A further object is to provide means, carried by the locomotive and operated by the engineer, so that the engine may pass over the railway without operating the gates if so desired.

A still further object is to provide structures which may be applied to single or double railway tracks in an equally effective manner, and without material change thereto.

These and other like objects are attained by the novel construction and combination of parts hereinafter described and shown in the accompanying drawings, forming a material part of this disclosure, and in which—

Fig. 4 is an enlarged transverse sectional view taken through one of the gate operating mechanisms.

Fig. 5 is top plan view thereof.

Fig. 8 is a fragmentary view showing one of the gate retaining means.

Figure 1:
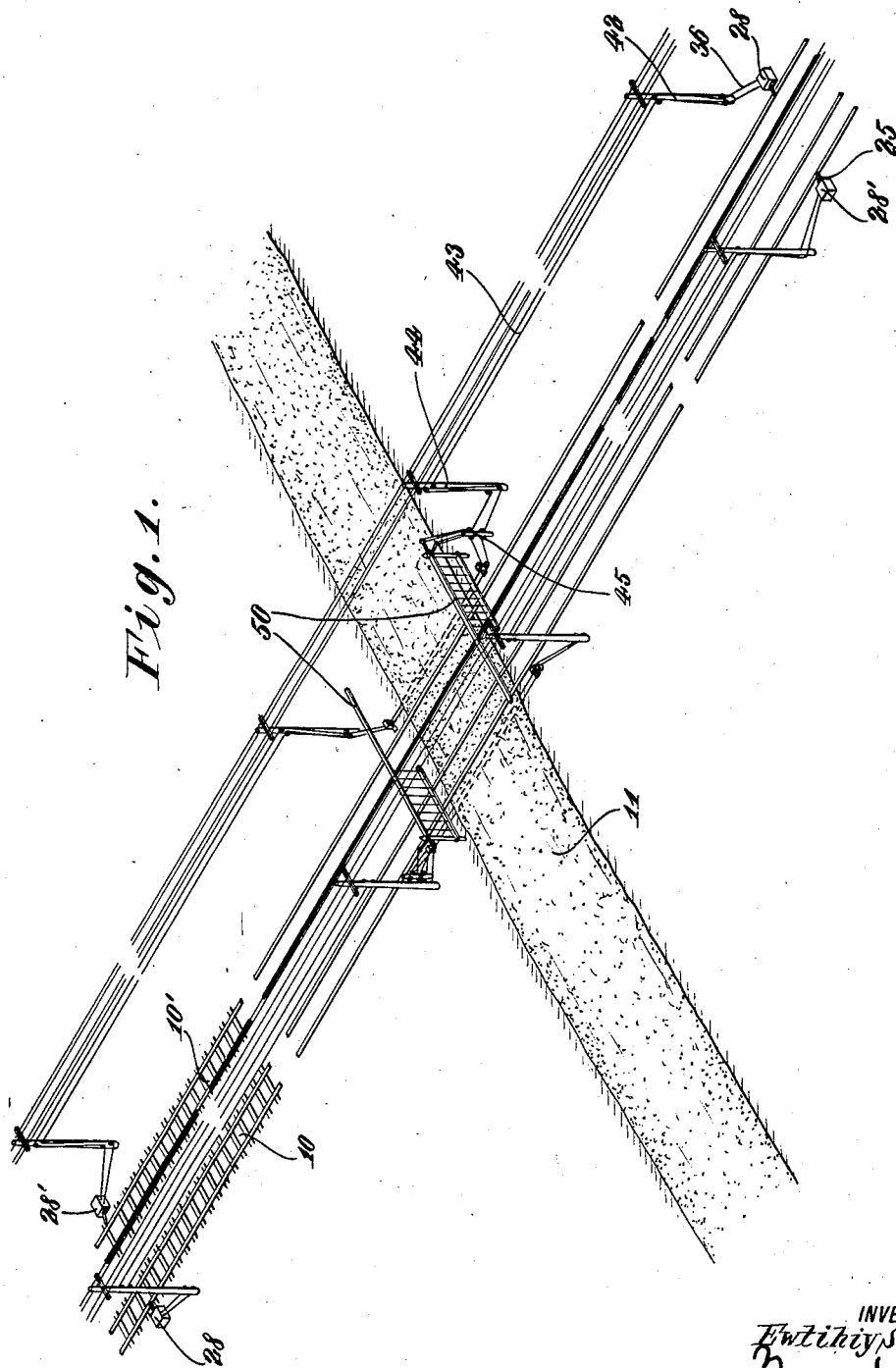
Figure 1 is a perspective view showing a section of a railway track and highway crossing, the same indicating the application of the safety device.
Figure 2:
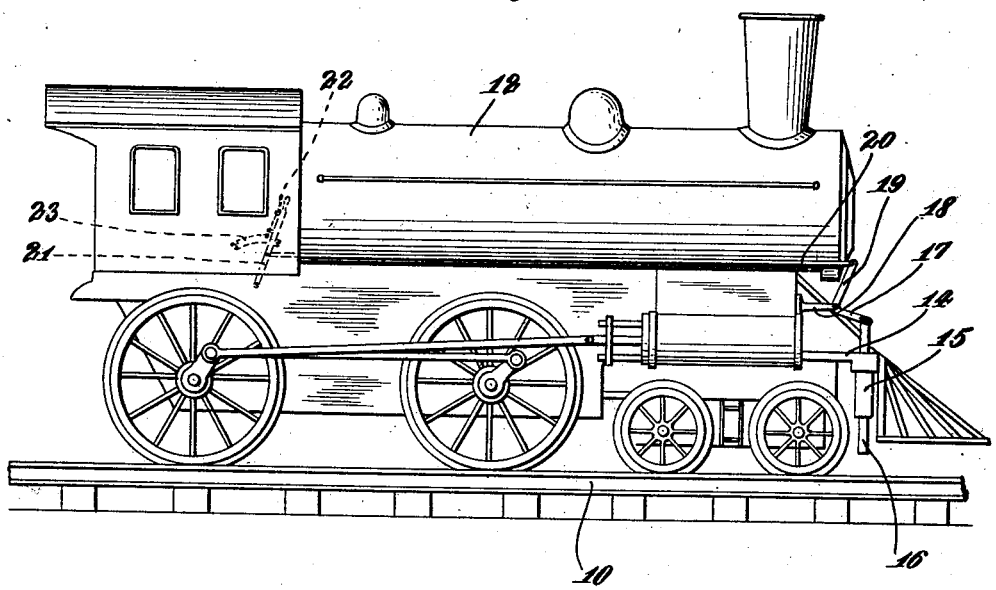
Fig. 2 is a side elevational view showing a conventional type of locomotive and indicating the application of the engaging elements connected therewith.
Figure 3:
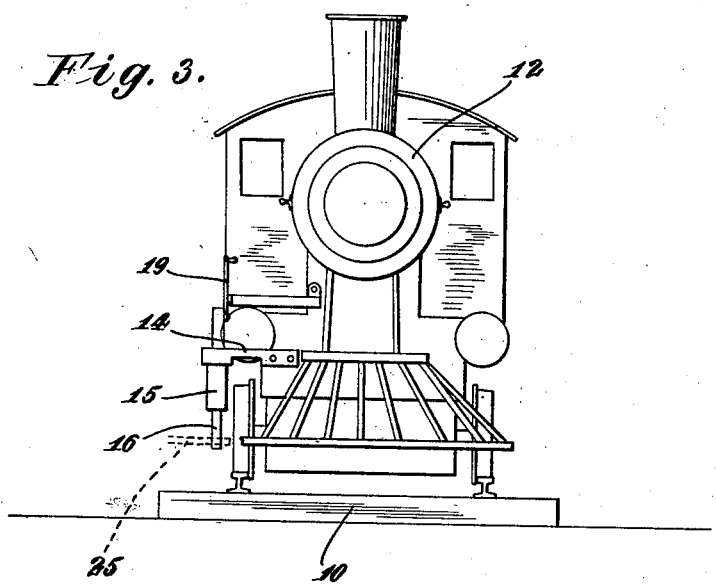
Fig. 3 is a front view of the same.
Figure 6:
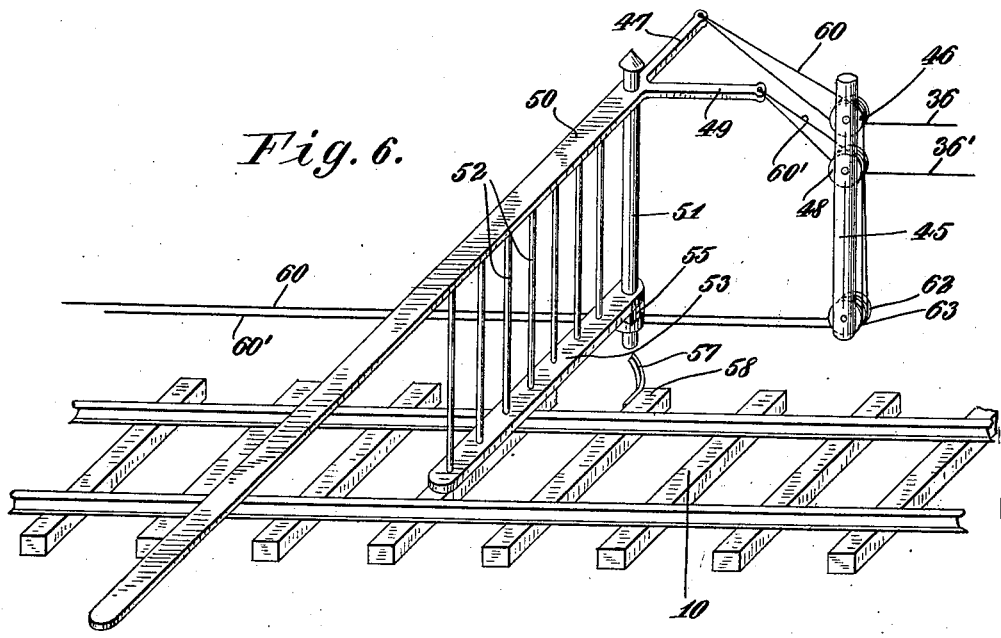
Fig. 6 is a perspective view showing the arrangement of an automatic gate and railway.
Figure 7:
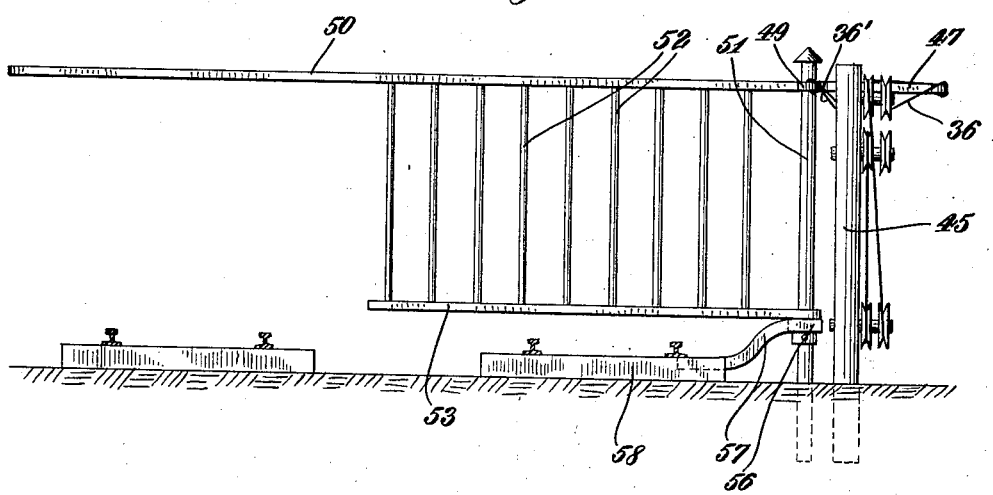
Fig. 7 is a transverse sectional view showing a conventional type of railway and indicating the application of the gate.

Referring to the drawings, the numerals 10 and 10' represent conventionally a pair of railway tracks of the usual construction, the same crossing a highway 11, used for vehicles and pedestrians, while the numeral 12 represents an ordinary type of locomotive adapted to the railway tracks.

Arranged upon each of the locomotives, adapted to operate over a railway provided with automatic gates of the hereinafter mentioned construction, at the front end thereof is a bracket 14 the same extending to the front and to one side, and formed with the bracket is an elongated hub or boss 15 in which is operably engaged a sliding plunger rod 16 its upper extending end being pivoted to one arm 17 of a bell-crank lever, journaled on a bracket 18, the other arm 19 of the bell-crank lever being engaged with a link 20 extending longitudinally beside the boiler of the locomotive and entering the cab, where it is attached to an operating lever 21, pivoted at its lower end within the cab, its upper end being engaged with a detent 22, operable within the sector 23, so that the plunger 16 may be held in an adjusted position.

Obviously, when the plunger is in a raised position the locomotive may travel over the railway without in any manner affecting the action of the gate, thus permitting the engine to back without moving the gate.

When the plunger 16 is in a depressed position it is adapted to make contact with an arm 25 formed with a projecting lever 26, extending laterally outward from a casing 28, the lever being pivoted to move in either direction upon a pin 29 fixed within the casing and being normally held in a central position, due to the pull of a pair of opposed tension springs 30 which are secured within the casing at their outer ends and to the lever at their inner ends.

Formed with the lever 26, opposite the fulcrum point 29, is a plurality of spoke arms 31 extending to a rim segment 32, the teeth of which are in engagement with a pinion 33, mounted upon a spindle 34, journaled in the sides of the casing, and affixed upon the spindle 34, is a sheave or sprocket wheel 35 over which runs a chain 36, one end passing over the guide pulley 38, journaled in brackets secured within the casing and extending outward at the front through openings suitably formed therein adjacent to the slot through which the lever 26 extends.

The chains are then conducted over guide pulleys 39 and 40, then over similar guide pulleys fixed upon posts 42, and connected with suitable wires or cables passing over guide pulleys arranged upon posts 44 adjacent to the roadway, from whence they lead downward toward the ground, passing to a third post 45, one of the connection elements 36 passing under pulleys 46 and thence connecting with an arm 47. The other connection 36' passes under pulley 48, fixed to the post 45 and connects with an arm 49, attached to a gate rail 50, both of these arms extending rigidly at right angles from a rail 50, pivoted upon a post 51 and connected by vertical bars 52 with a lower rail 53, forming a gate from which the upper rail 50 extends at some distance beyond the lower rail.

The lower side of the arm 53, has fixed upon it a square collar 55 adapted to make contact with the free end 56, of a spring 57, secured to one of the ties 58, thus holding the gate in either of its adjusted positions, that is extended over the trackway or across the high-way, so that it may not be readily moved by wind, etc.

Also connected with the extending arm 47 is another cable 60, a similar cable 60' being connected with the arm 49, running over the pulleys 46 and 48 respectively and then over other pulleys 62 and 63, to a similar operating box 38' and to like connections on the opposite side of the roadway, thus enabling the engineer without moving from the locomotive to operate the gates so as to prevent traffic over the highway or to return the gates to their proper position after the engine has passed.

Figure 9:
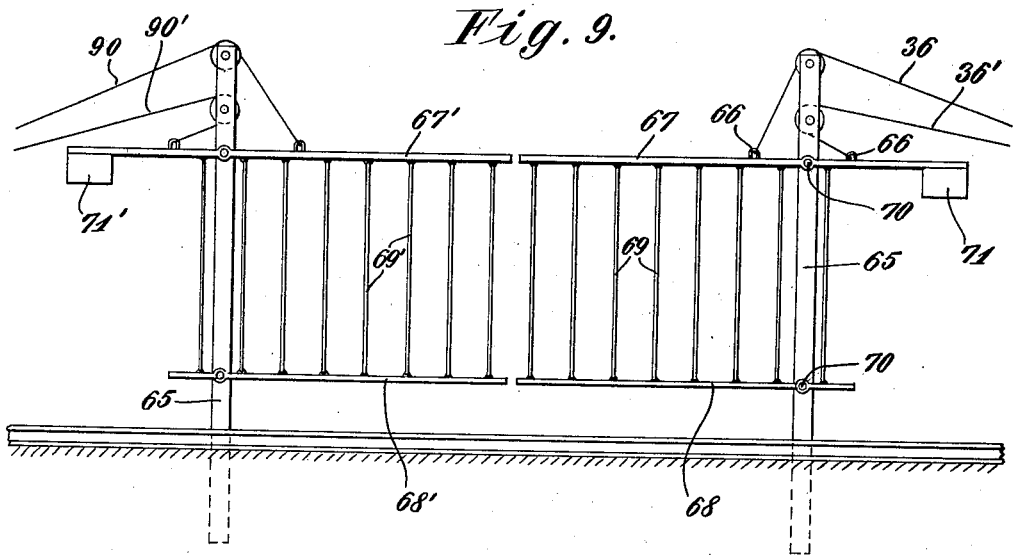
Fig. 9 is a side elevational view showing a modified form of the gate and operating means, the gates being in a lowered position.
Figure 10:
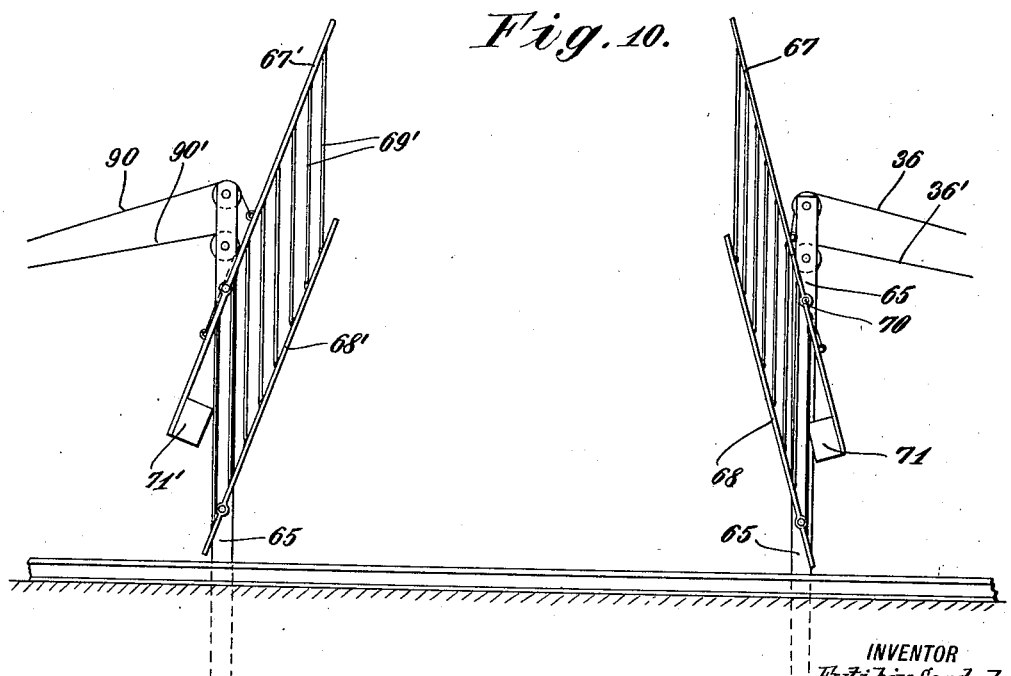
Fig. 10 is a side elevational view showing the gates in a raised position.

In the modification shown in Figs. 9 and 10, the cables 36 and 36' pass over appropriate pulleys journaled on posts 65 and are connected with the eyes 66 secured upon the top rail 67 of a vertically operable gate comprised of the lower members 68 and having pivoted therebetween vertical bars 69, the upper and lower rail moving upon pivots 70 set in the post 65 the upper rail being supplied with a counterbalance 71 so that the movement of the gate is easily effected. An oppositely disposed gate acting in coöperation therewith is actuated by the cables 90 and 90' in a manner which will be clearly evident upon inspecting Figs. 9 and 10.

Figure 11:
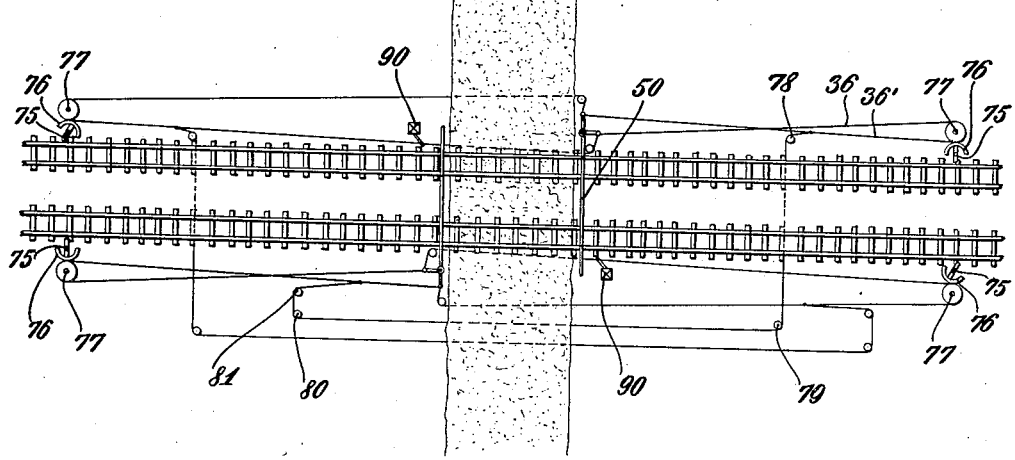
Fig. 11 is a plan view of a railway track showing the gates in an open position so that traffic may pass over the highway.
Figure 12:
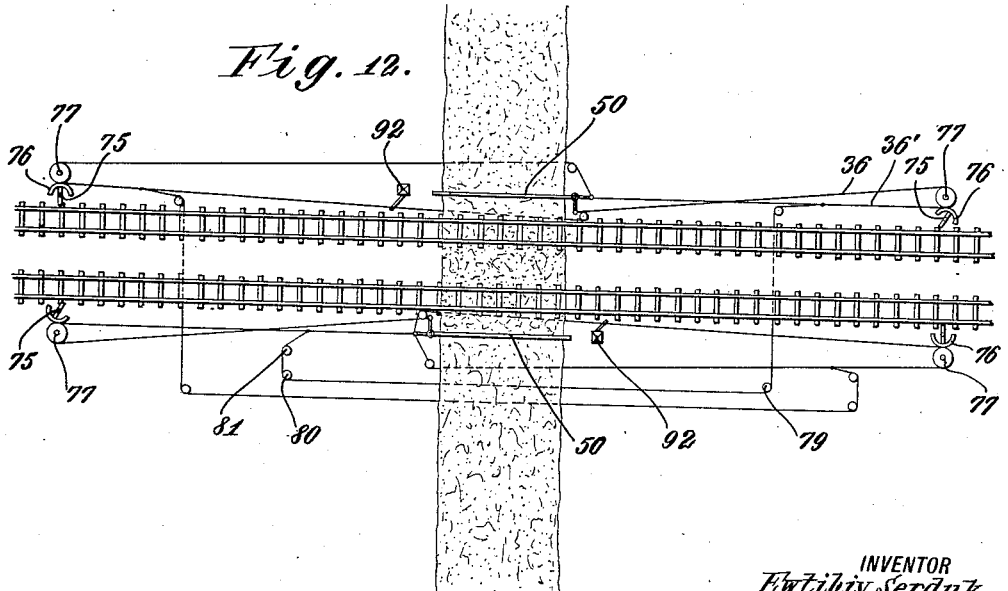
Fig. 12 is a similar plan view showing the gates in a closed position.

Figs 11 and 12 show levers 75 mounted centrally in their length and carrying at their outer ends segments 76 engaging with the periphery of pulleys 77 operating the cords 36 and 36' in the manner before mentioned.

In this arrangement a double track is shown in which one of the cords 36' has a branch passing below the trackway in connection with guide pulleys 78 and 79 and then over pulleys 80 and 81, connecting with the actuating cord for the opposite gate in an obvious manner.

Thus the gates, generally denominated by the numeral 50, are actuated simultaneously upon each side of the railroad, Fig. 11 showing the gates closed to the railway and permitting passage along the highway, while in Fig. 12 a reversed condition is shown in which the highway traffic is prevented and the railway opened to passage of the trains.

Figure 13:
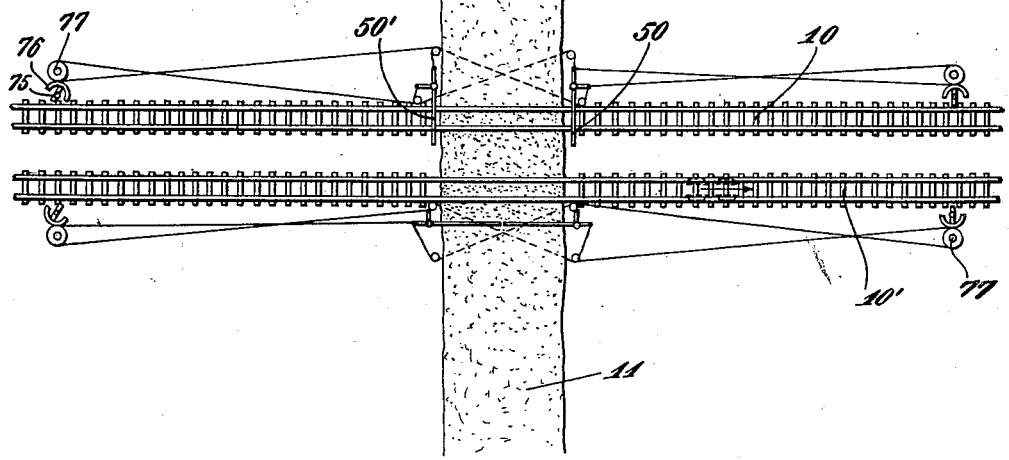
Fig. 13 is a plan view showing a modified form of gate and controlling means.
Figure 14:
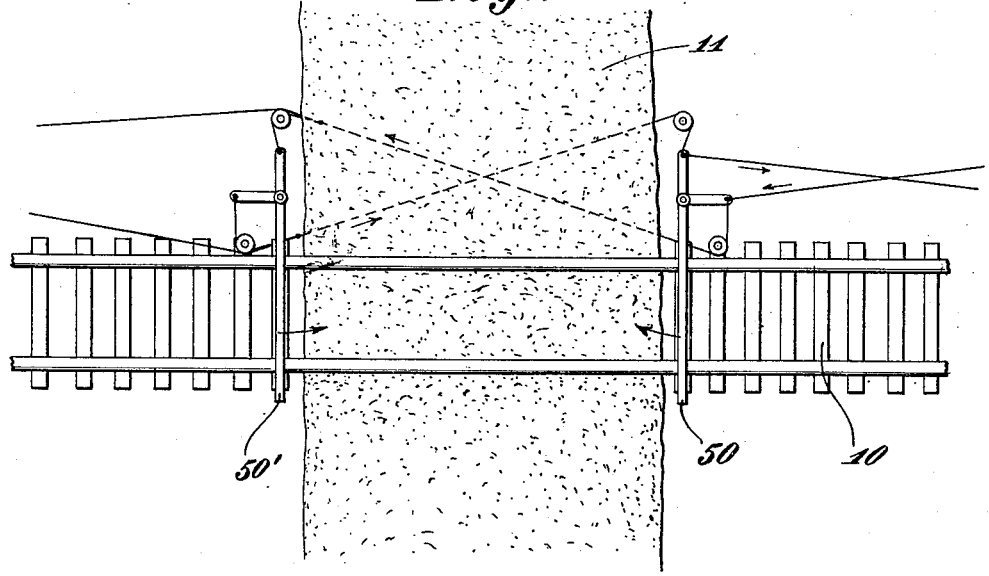
Fig. 14 is an enlarged plan view of the same.

In Fig. 13 a modified form of the structure is presented in which the gates 50 are turned so as to intersect travel upon the approach of the locomotive, the gates at that time standing crosswise of the railway tracks so that they can be seen by the approaching train at a considerable distance while the arrangement of cords and connections act coöperatively to actuate the same as will be clearly apparent. In addition to operating the gate devices it will also be obvious that train signals 92 may be disclosed and operated in connection with the movement of the gates.

Having thus described my invention what I claim as new and desire to secure by Letters Patent, is—

1. In a device as described, in combination, a series of railway ties, a post secured alongside the same, a gate pivoted upon said post so as to extend crosswise of rails, an elongated upper rail secured upon said gate and providing one crank arm projecting beyond said post, another crank arm formed at an angle to the other crank arm upon said rail, a square collar carried dependingly by said gate adjacent said post and at its lower end, a spring finger having one portion thereof secured to a tie and being deflected outwardly so as to provide an arm bearing against said square collar to lock said gate in open and closed positions, cables secured to said crank arms, and means for operating said cables alternately to open and close said gate.

2. In a device as described, in combination, a casing, a pair of vertically alining pivots mounted horizontally centrally therein, a horizontally-swinging gate, a pulley journaled upon one of said pivots, a geared sector mounted upon the other pivot, a depending crank arm secured upon said geared sector the lower portion of said casing being formed with an opening in which said depending arm moves laterally, flexible means connected to said pulley and attached to said gate to operate the latter, said crank arm projecting below said casing, and a pair of oppositely-arranged coiled springs having each one end secured to one side of the casing and its other end secured to said crank arm, said springs normally holding said crank arm vertical.

3. In a device as described, in combination, a vertical post, an upper rail pivoted eccentrically upon said post, a depending weight attached to the free end of the shorter length of said rail, another rail pivoted to said post, a series of connecting rods pivotally secured at opposite ends to the upper and lower rails, a pair of vertically alined pulleys journaled upon the upper portion of said post a cable passing over the lower pulley and returning in back of the pivot of the upper rail being secured to the latter, a second cable passing over the upper pulley and extending downwardly so as to connect in front of the last-named pivot to the upper rail, said cables otherwise extending in the same direction, and means connected to both pulleys for pulling and releasing them together so as to lift and lower said rails.

In testimony whereof I have affixed my signature.

EWTIHIY SERDUK.

Copies of this patent may be obtained for five cents each, by addressing the "Commissioner of Patents, Washington, D. C."